INVENTORS
ROBERT C. CLARK
JERRY M. JONES
BY
Harold R. Woods
THEIR ATTORNEY

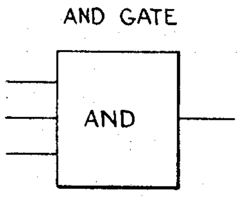
FIG. 2a
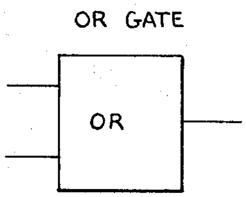
FIG. 2b
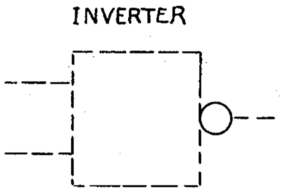
FIG. 2c
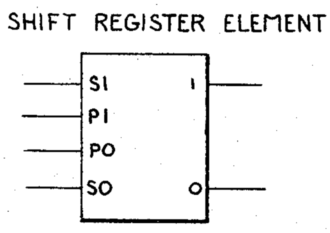
FIG. 2d
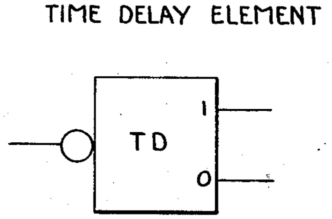
FIG. 2e
FIG. 2
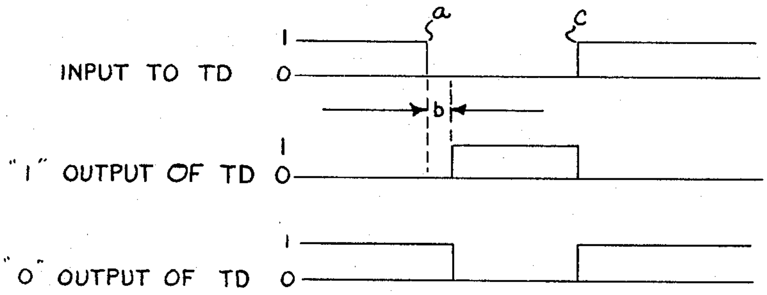
FIG. 3
INVENTORS
ROBERT C. CLARK
JERRY M. JONES
BY
Gerald R. Woods
THEIR ATTORNEY INVENTORS
ROBERT C. CLARK
JERRY M. JONES
BY
Gerald R. Woods
THEIR ATTORNEY INVENTORS
ROBERT C. CLARK
JERRY M. JONES
BY
Gerald R. Woods
THEIR ATTORNEY INVENTORS
ROBERT C. CLARK
JERRY M. JONES
BY
Gerald R. Woods
THEIR ATTORNEY INVENTORS
ROBERT C. CLARK
JERRY M. JONES
BY
Harold R. Woods
THEIR ATTORNEY INVENTORS
ROBERT C. CLARK
JERRY M. JONES
BY
[signature]
THEIR ATTORNEY United States Patent Office 3,441,739

Patented Apr. 29, 1969

3,441,739

WIDTH GAGE WHICH GENERATES PULSE WIDTH PROPORTIONAL TO DEVIATION FROM DESIRED WIDTH

Robert C. Clark and Jerry M. Jones, Roanoke, Va., assignors to General Electric Company, a corporation of New York Filed Feb. 1, 1968, Ser. No. 702,311

Int. Cl. G01n *21/30;* H01j *3/14*

U.S. Cl. 250—219 6 Claims

ABSTRACT OF THE DISCLOSURE

For measuring strip width deviation, a gage including a polygonal drum with peripheral mirrors. As the drum rotates perpendicularly to the strip edges, the peripheral mirrors "scan" across the edges through intermediate mirrors. The mirrors reflect the "scanned" view to photosensitive circuits which generate a first signal when one edge is sensed and a second signal when the opposite edge is sensed. If the first signal appears first, a first current source is energized. If the second signal appears first, another current source is energized. Both current sources are de-energized when both the first and second signals have appeared. The magnitude and polarity of the current produced indicates the magnitude and type of width deviation. Modified gages permit infrared scanning and and scanning of extremely narrow strips.

*Background of the invention*

The present invention relates to measuring and testing and more particularly to a non-contacting width gage for continuously measuring deviations from a desired width for a moving sheet of material such as steel strip in a rolling mill.

During the manufacture of steel strip, the width of the strip is usually measured continuously to allow corrections to be effected before a substantial amount of off-size strip is produced. Since strips of varying widths are often processed in random order, a width measuring device must be readily adjustable to permit substantially uninterrupted monitoring of all successively processed strips. Moreover, a width measuring device must be ruggedly constructed to assure that it operates reliably under the adverse conditions normally existing in a steel mill. While simply strip-contacting width gages exist, such gages are considered to be impractical for use in a steel mill since they are subject to being damaged by contact with the heated strip as the strip bounces vertically and shifts laterally on its journey through the mill.

To overcome the problems inherent in the operation of strip-contacting width gages, non-contacting width gages were developed. One known type of non-contacting width gage includes a pair of movable electron cameras separated from one another above a moving strip by a distance initially equal to the desired width of the strip. Each camera scans across the strip in a direction lateral to the strip movement through the mill and senses the boundary of the strip as a change in voltage potential established as a result of the difference in brightness between the strip and its surroundings. Potential changes result in the energization of drive motors which vary the spacing between the two electron cameras to keep each camera directly above one of the actual edges of the strip. Since the distance between the electron cameras represents the actual width of the strip, the measurable changes in camera spacing represent deviations in the width of the strip. One recognized disadvantage of this system is the interruption in monitoring which occurs while the drive motors move the cameras to their new positions when a deviation in strip width is encountered.

To prevent monitoring interruptions, a second gage using a pair of stationary electron cameras was developed. Each of the cameras controls a separate synchronized multivibrator, the output of which is filtered in a low pass filter to remove undesirable unharmonics. The phase difference between outputs of the two multivibrators is measured in a phase difference indicator which provides a visual indication of the strip width deviation. While this system is able to react more quickly than the system utilizing the movable electron cameras, it is not entirely satisfactory since the multivibrators and the phase difference indicator must be repeatedly calibrated to assure continuously accurate phase difference measurement over an extended period of time.

*Summary of the invention*

The present invention reduces the problems of calibration while retaining the capability of rapid response by utilizing logic circuitry in a non-contacting width gage. The gage includes scanning means which are responsive at the first and second parallel boundaries of an object whose dimensions are to be measured to produce independently first and second signals. Circuit means respond to the relative displacement of the first and second signals to produce a current pulse, the duration and polarity of which are determined by the magnitude and type of deviation from a desired dimension for the object.

*Description of the drawings*

While the specification concludes with claims particularly pointing out and distinctly claiming that which is regarded as the present invention, the details of one embodiment of the invention along with further objects and advantages may be more readily ascertained from the following detailed description when read in conjunction with the accompanying drawings in which:

FIG. 2, consisting of secondary FIGURES 2*a*–2*e*, is a glossary of the logic elements found in the detailed logic circuits referred to below;

FIG. 3 is a waveform chart which clarifies the explanation of the characteristics of the time delay element shown in FIG. 2*d*;

*Detailed description*

Figure 1:
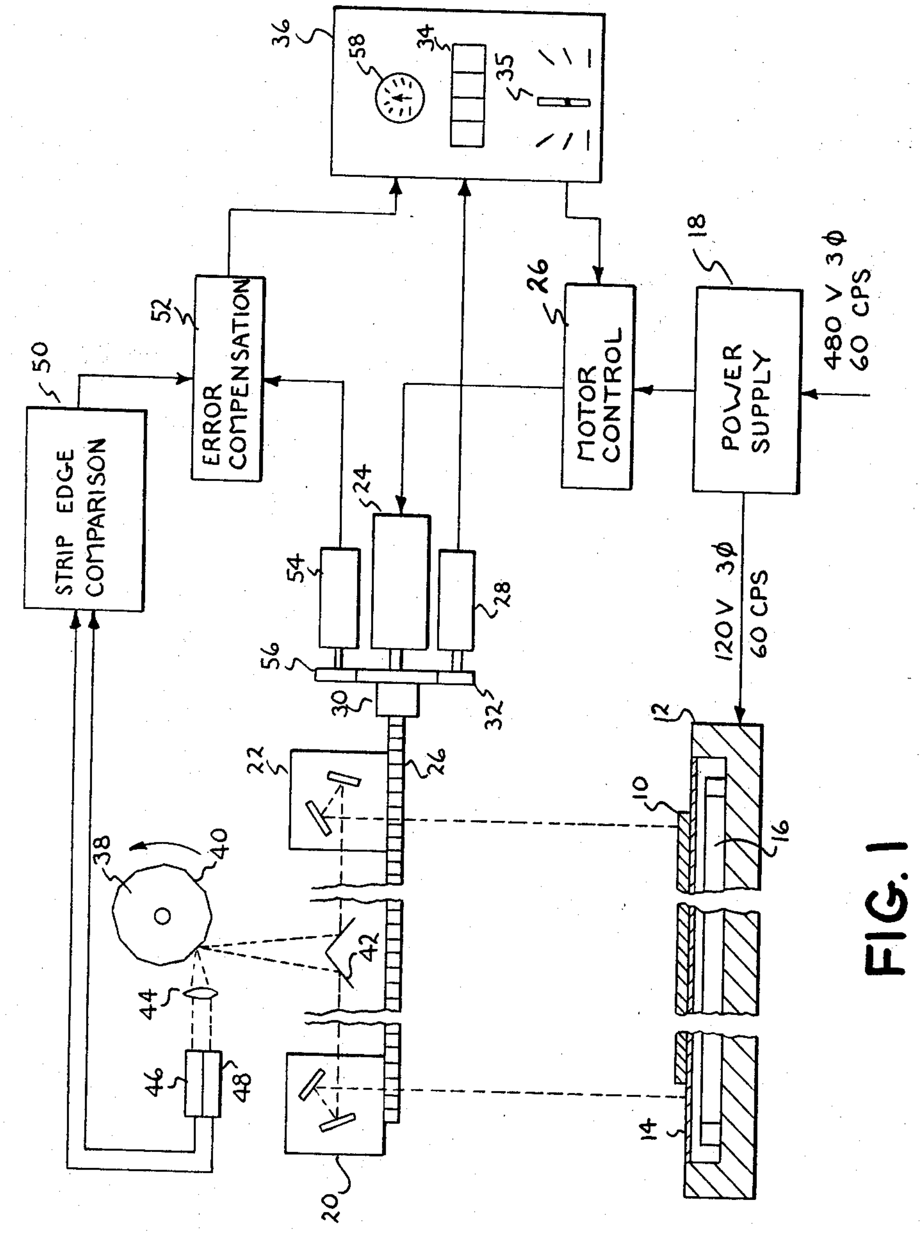
FIG. 1 is a simplified view of the general arrangement of the width gage including representations of certain of the physical components.

FIG. 1 includes an end view of a steel strip 10 undergoing processing in a hot strip steel rolling mill. In this mill, a non-contacting strip width measuring gage is located over a runout table 12 having a supporting surface 14 for the strip 10. A strip backlighting unit including a fluorescent bulb 16 provides a source of illumination for the non-contacting width gage. In one embodiment, bulb 16 is energized by three-phase current from a power supply 18 to minimize fluorescent flicker. In another embodiment, the light source may be a mercury vapor lamp, thereby obviating the need for a three-phase current.

The non-contacting width gage includes first and second mirror systems 20 and 22 positioned above the left and right edges of the strip 10, respecively. The mirror systems 20 and 22 are separated from one another by a distance equal to the desired width of the strip 10. To adapt the gage for use with strips of different widths, the spacing between these systems is varied by a motor 24 driving a position-changing screw 26 through an output gear 30. In a preferred embodiment, the motor 24 is a three phase induction gear motor with pole-changing provisions which permit the motor 24 to run at different speeds for changing the spacing of the mirror systems 20 and 22 at either a fast or a slow rate. The motor 24 is controlled by a conventional motor control unit 26 connected to the power supply 18. A mirror system position selsyn 28, coupled to the output gear 30 through a gear unit 22, generates a signal proportional to the spacing of the mirror units 20 and 22 and transmits this signal to a scan width indicator 34 in a display panel 36. By watching indicator 34 and manipulating a motor speed and direction control knob 35, an operator adjusts the spacing of the mirror systems 20 and 22 to a desired width.

The width gage includes a rotating polygonal drum 38 having a plurality of peripherally-located mirrors or facets such as facet 40. As the drum is driven in a counter-clockwise direction about an axis of rotation parallel to the direction of strip movement, the changing position of each facet with reference to mirror systems 20 and 22 causes the facet to "scan" from left to right or laterally across the steel strip 10. The fields of view "seen" by the facets 40 through the mirror units 20 and 22 and an intermediate roof mirror 42 are reflected through a focusing lens 44 to a pair of adjacent photosensitive devices 46 and 48. As the drum 38 rotates, photosensitive device 48 "sees" a field of view which in part changes from the bright backlighted area at the left of strip 10 to the darker surface of the strip 10. The resultant change in the intensity of the illumination causes the photosensitive device 48 to produce a signal that is applied to a strip edge comparison circuit 50. The photosensitive device 46 similarly "sees" a field of view which changes in part from the dark surface of the strip to the backlighted area at the right of the strip 10. The change in illumination intensity is sensed by the photoelectric device 46 which responds by producing a second electrical signal for application to the strip edge comparison circuit 50. The strip edge comparison circuit 50 compares the relative displacement of the signals generated by the photoelectric devices 46 and 48 and produces a current pulse having a duration and polarity proportional to the magnitude and type of strip width deviation.

The basic operation of the gage is as follows. If the strip 10 is the desired width and the mirror systems 20 and 22 are separated by the desired width, the field of view reflected through the mirror system 20 is at the left edge of the strip 10 at the same instant the field of view reflected through the mirror system 22 is at the right edge of the strip 10. The simultaneously-generated signals produced by photoelectric devices 46 and 48 under these conditions cause strip edge comparison circuit 50 to provide an indication that the strip is the desired width. If the strip 10 is oversized, the field of view of photosensitive device 48 reaches the left edge of the strip 10 before the field of view of photosensitive device 46 moves from the right edge of the strip 10 onto the backlighted area. The time lapse between or the relative displacement of the signals generated by the photoelectric devices 48 and 46 provides an indication of the magnitude of the width deviation. If the strip 10 is undersized, the field of view of photosensitive device 46 moves from the right edge of strip 10 onto the backlighted area before the field of view of photosensitive device 48 reaches the left edge of the strip 10. Under these conditions, the photosensitive device 46 generates the first signal. After a time lapse proportional to the magnitude of deviation from the desired width, photosensitive device 48 generates the second signal. The signals are processed by the strip edge comparison circuit 50 which produces an error signal having an average magnitude and polarity proportional to the magnitude and type of strip width deviation.

The error signal produced by the strip edge comparison circuit 50 is applied to a compensation circuit 52 which modifies the error signal in a predetermined manner to allow for the fact that the deviation period per inch of strip width error varies inversely with the desired strip width. The extent of the effect of the compensation circuit 52 on the error signal from the strip edge comparison circuit 50 depends on the scan width, which is measured by means of a potentiometer 54 coupled to the output gear 30 of the mirror positioning motor 24 through a gear unit 56. The modified error signal is applied to a width deviation meter 58 in the display panel 36. The compensated signal may also be used to control edgers or other suitable milling devices for regulating the width of steel strips subsequently processed in the mill.

The strip edge comparison circuit is described in greater detail below. To facilitate that description, the glossary of logic elements shown in FIG. 2 is described now. In the following detailed description, the term "ONE signal" refers to a signal having a predetermined voltage (usually +5 volts) while the term "ZERO signal" refers to a lack of signal voltage. For the logic elements shown, input terminals are usually at the left side or at the top of the symbols whereas output terminals are usually at the right side of the symbols.

*AND gate*

FIG. 2*a* shows an AND gate having three input terminals and a single output terminal. If ONE signals are applied to all of the input terminals simultaneously, a ONE signal appears on the output terminal. If a ZERO signal is applied to any of the input terminals, the AND gate is said to be inhibited and a ZERO signal appears at the output terminal.

*OR gate*

FIG. 2*b* shows an OR gate having a pair of input terminals and a single output terminal. If a ONE signal is applied to any of the input terminals, a ONE signal appears at the output terminal. If ZERO signals are applied to all of the input terminals, a ZERO signal appears at the output terminal.

*Inverter*

FIG. 2*c* shows an inverter symbol, a small circle at the input or output terminals of other types of logic elements. The inverter changes the state of any logic level signal applied to it. For instance, if a ONE signal is applied to the left side of the inverter shown in FIG. 2*c*, a ZERO signal is produced at the right side. Conversely, where a ZERO signal appears at the left side of the inverter, a ONE signal appears at the right side.

*Shift register element*

FIG. 2*d* shows a shift register element which includes S1 (steer to 1) and S0 (steer to 0) input terminals along with P1 (pulse to 1) and P0 (pulse to 0) input terminals. The shift register also includes a "1" or normal output terminal and a "0" or inverse output terminal. If the S1 input terminal is held at 1 and the S0 input terminal is held at 0, the falling edge of a pulse on input terminal P1 causes the shift register element to assume its set condition wherein the "1" terminal has a ONE signal and the "0" terminal carries a ZERO signal. Conversely, if the S1 terminal is held at 0 and the S0 terminal is held at 1, the falling edge of a pulse at the P0 input terminal causes the shift register element to assume its reset condition wherein the "1" terminal carries a ZERO signal while the "0" terminal carries a ONE signal. If the P1 and P0 input terminals are connected to a common pulse source, a pulse causes the shift register element to assume its set condition when S1 carries a ONE signal or its reset condition when S0 carries a ONE signal. The shift register element may also have a clearing (C) terminal. The application of a ONE signal to the C terminal causes the shift register element to assume its reset condition.

*Time delay element*

FIG. 2*e* shows a time delay element having an input terminal with an inverter and a pair of output terminals, a "1" or normal output terminal and a "0" or inverse output terminal. When a ONE signal is removed at the left side of the input inverter, a predetermined time delay occurs before the time delay element assumes its set state wherein the "1" terminal carries a ONE signal while the "0" terminal carries a ZERO signal. The time delay element remains in its set state until the signal at the left side of the input inverter again goes to ONE. As the signal goes to ONE, the time delay element is immediately driven into its reset state wherein the "1" terminal carries a ZERO signal and the "0" terminal carries a ONE signal.

The operation of a time delay element may be clarified with reference to FIG. 3. The uppermost waveform of FIG. 3 is the input signal at the left side of the input inverter for the time delay element shown in FIG. 2*e*. As the signal at this point goes from ONE to ZERO at time "*a*," no change occurs until a period "*b*" elapses. At the end of the period "*b*," the signal on the "1" terminal rises to ONE while the signal on the "0" terminal falls to ZERO. The time delay element remains in this state until the signal at the left of the inverter rises to ONE at time "*c*." At time "*c*," the time delay element immediately changes state. In other words, the signal on the "1" terminal falls to ZERO while the signal on the "0" terminal rises to ONE.

The time delay element may function as a noise filter by virtue of the fact that rising signals repeated during the time delay period "*b*" keep the time delay element from changing state even though the element had been triggered by a falling signal at time "*a*." In a circuit where electrical noise is a problem, a time delay element may be triggered by a spurious dip in a signal. However, if the signal returns to its normal level within the time delay period, the time delay element remains in its original state.

Figure 4A:
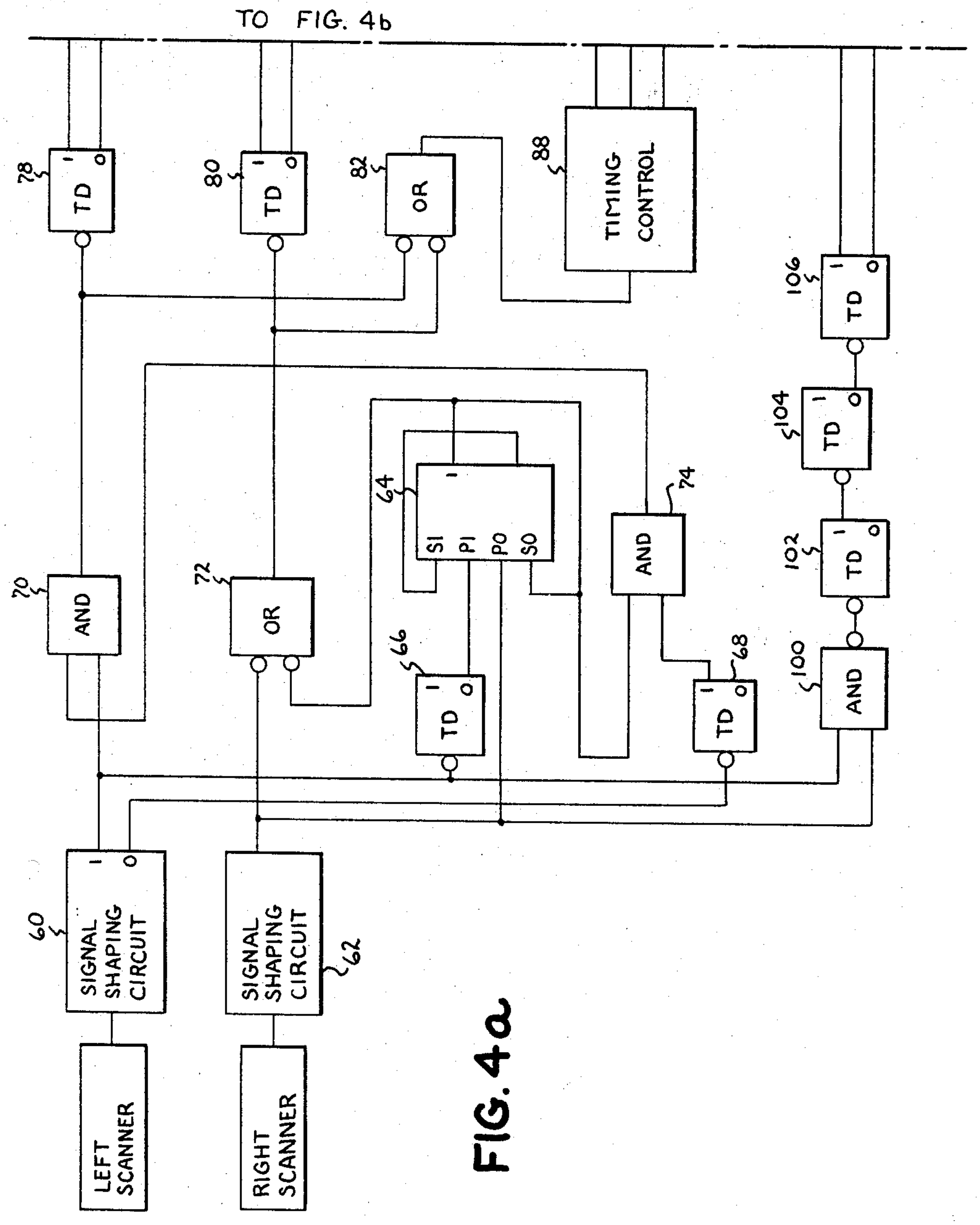
FIGS. 4*a*–4*b* are the left and right halves respectively of an edge comparison circuit for a non-contacting width gage constructed in accordance with the present invention.
Figure 4B:
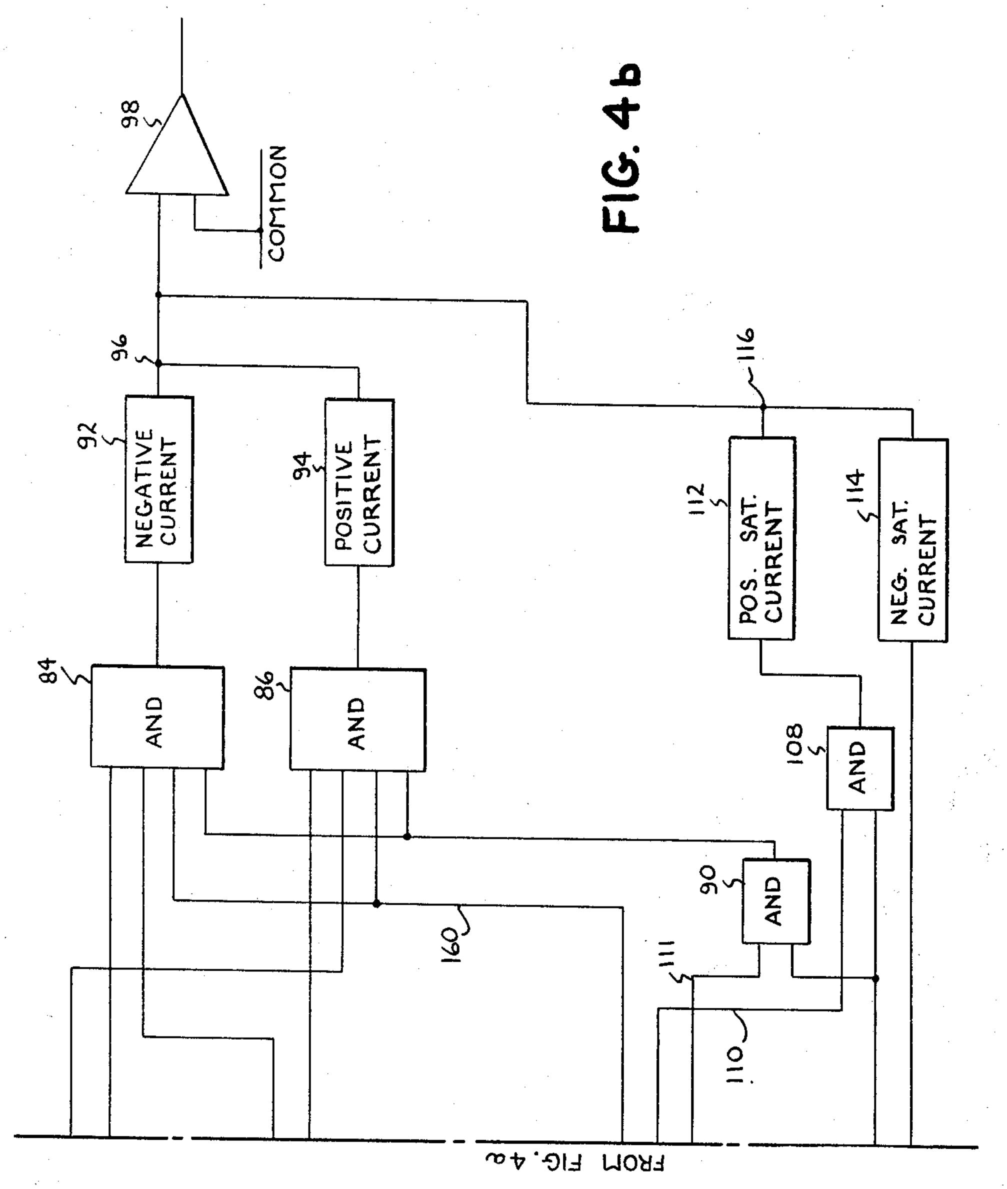

Referring now to FIGS. 4*a* and 4*b*, the signal developed by the left scanner system, which includes the mirror system 20 and the photosensitive device 48, is applied to a signal shaping circuit 60 having normal and inverse output terminals. The signal developed by the right scanner system, which includes the mirror system 22 and the photosensitive device 46, is applied to a second signal shaping circuit 62 having a normal output terminal only. The signal shaping circuits 60 and 62 are connected to a false signal suppressing system including a shift register element 64, a pair of time delay elements 66 and 68, AND gates 70 and 74, and OR gate 72. True signals are transmitted through AND gate 70 and OR gate 72 to a pair of time delay elements 78 and 80 and to an OR gate 82 in a current control circuit. The normal and inverse outputs of the time delay elements 78 and 80 are connected to a pair of AND gates 84 and 86, each having a third input on a lead 160 from a timing control circuit 88 and a fourth input from an AND gate 90 in an overlimit monitoring circuit. The timing control circuit 88 is controlled through the OR gate 82. A source 92 of negative current is energized by a ONE signal on the output of the AND gate 84. A source 94 of positive current is energized by a ONE signal on the output of AND gate 86. The output of the current sources 92 and 94 are tied to a common junction 96 at one input to a comparison amplifier 98.

The overlimit monitoring circuit referred to above includes an AND gate 100 connected to the normal output terminals of the signal shaping circuits 60 and 62, respectively. The overlimit monitoring circuit further includes a series of time delay elements 102, 104, and 106 connected in a series string to the output of the AND gate 100. The normal output terminal of the time delay element 106 is connected both to the AND gate 90 and to a second AND gate 108, the other input to which is provided through a lead 110 to the timing control circuit 88. The output of the AND gate 108 controls a source 112 of positive saturation current. The inverse output terminal of the time delay element 106 is the input to a source 114 of negative saturation current. The outputs of current sources 112 and 114 are combined at a common junction 116 which is, in turn, directly tied to the junction 96 at the one input to the comparison amplifier 98.

Figure 5:
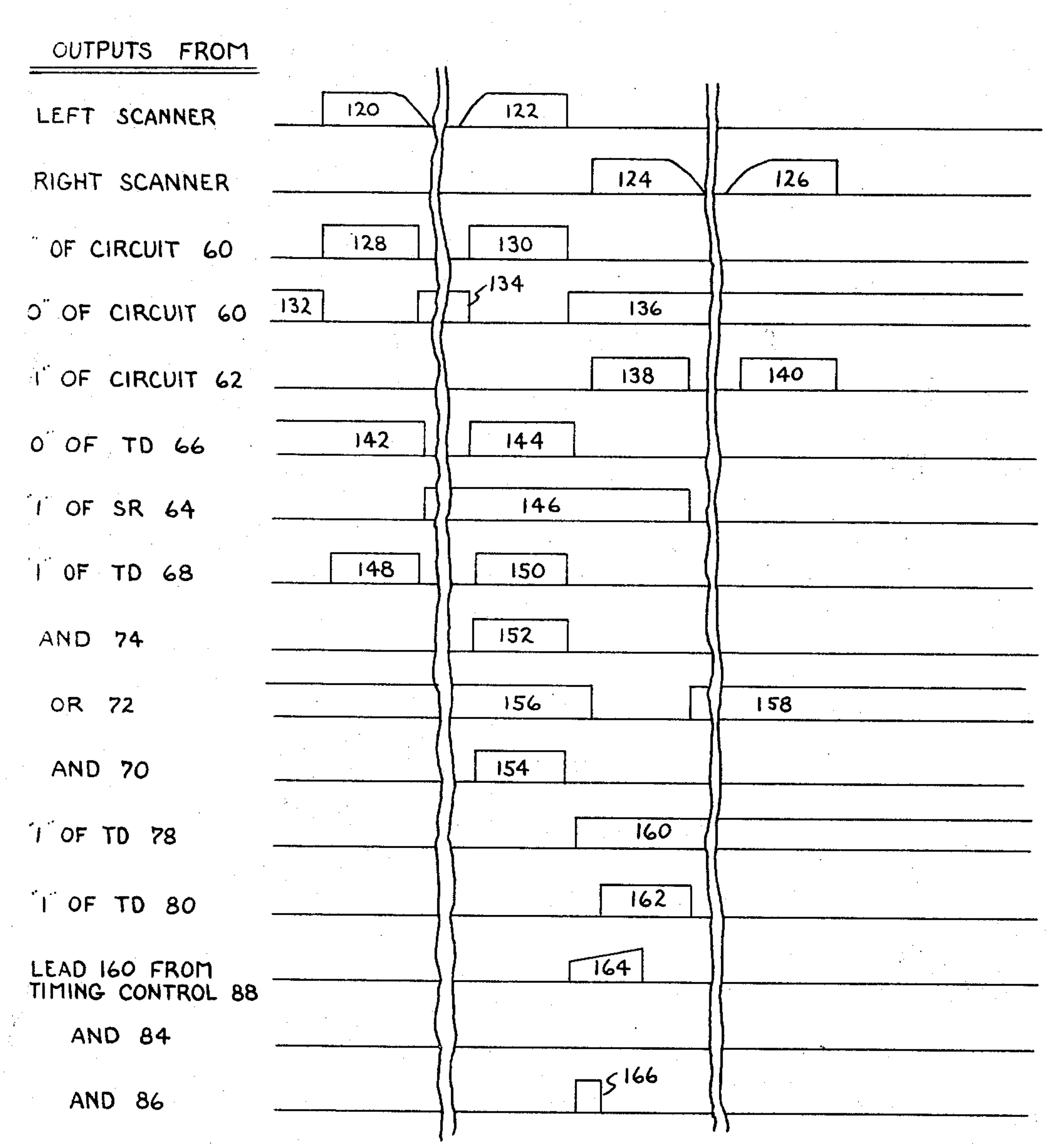
FIG. 5 is a chart of waveforms existent at various points in the logic circuits shown in FIGS. 4*a*–4*b* during a width monitoring operation.

The operation of the edge comparison circuit 50 may be more readily understood with the aid of the waveforms in FIG. 5. As the drum 38 rotates, each facet 40 completes one scanning cycle. The signals generated during each cycle are a result of the fact the photosensitive devices 46 and 48 produce a current that is greatly increased while their fields of view take in the backlighted areas. The first signal in each cycle occurs when the field of view of the photosensitive device 48 moves from the right side of the strip 10 onto the backlighted area. Since photosensitive device 48 is intended to detect the left edge only of strip 10, this false signal 120 with its sharp leading edge is generated as the field of view moves across the well-defined edge of the steel strip onto the backlighted area. The signal 120 has a sloping or ragged trailing edge generated as the field of view moves beyond the poorly-defined edge of the backlighted area to the edge of the runout table 12. As the drum 38 continues to rotate, the photosensitive device 48 senses a second change in voltage (signal 122) occurring as its field of view passes through the backlighted area at the left of the strip 10, across the edge of the strip 10, and onto the relatively darker strip surface. The leading edge of signal 122 rises slowly due to the relatively gradual increase in the intensity of the illumination as the field of view moves onto the backlighted area. However, the trailing edge of the signal 122 is relatively sharp since the trailing edge occurs when the field of view moves across the sharply defined left edge of the steel strip.

The duration of the signals such as 120 and 122 is dependent in part upon the width of the steel strip 10. If the strip is extremely wide, the signals 120 and 122 are relatively shorter since the field of view traverses narrower backlighted areas. Conversely, if the strip 10 is narrow the field of view traverses a wider backlighted area which results in a longer signal. In a preferred embodiment, the signals may range in length from 30 to 600 microseconds. The separation of the trailing edge of the signal 120 and the leading edge of the signal 122 is a function of the speed of rotation of the drum 38 and the number of facets on the drum; i.e., the scanning rate. In one embodiment, the drum includes 12 scanning facets and is rotated at speeds from 1140 to 1200 r.p.m. to vary the scanning rate between 228 and 240 cycles per second. Signals 120 and 122 are separated by the broken lines to indicate that the spacing is not to scale. Under actual operating conditions, the spacing between these signals may range from 100 to 300 microseconds. The photosensitive device 46 also detects a change in illumination intensity during each scanning cycle as its field of view moves from the right side of the strip 10 onto the backlighted area. The signal 124 generated by the photosensitive device 46 has a sharp leading edge and a sloping trailing edge. The last signal generated during each scanning cycle is signal 126, a false signal produced as the field of view of photosensitive device 46 moves from the backlighted area at the left of the strip 10 onto the strip surface.

Signals 120 and 122 from the left scanner are applied to a signal shaping circuit 60 to sharpen the slowly rising or falling edges and to amplify the signals to suitable logic levels. The signal on the normal output terminal of the signal shaping circuit 60 consists of a pair of elongated ONE signals 128 and 130 whereas the signal on the inverse output terminal consists of ONE signals 132, 134, and 136 which are inverted relative to ONE signals 128 and 130. The signals 124 and 126 from the right scanner system are similarly shaped by the signal shaping circuit 62 to form a pair of elongated ONE signals 138 and 140 appearing at the normal output terminal of the circuit 62.

The time delay element 66 serves as a noise filter for spurious signals appearing on the normal output terminal of the signal shaping circuit 60. A few microseconds after the shaped signal 128 from the circuit 60 falls to ZERO, the ONE signal 142 on the inverse or "0" terminal of the time delay element 66 also falls to a ZERO level. At the beginning of each scanning cycle, the shift register element 64 is in its reset condition wherein the ONE signal on its inverse output terminal is applied to the S1 input terminal. However, when the signal on the inverse output terminal of the time delay element 66 falls to ZERO, this falling signal at input terminal P1 causes the shift register element 64 to be steered to its set condition. The signal 146 on the normal output terminal of the shift register element 64 goes to ONE while the signal on the inverse output terminal goes to ZERO. The ONE signal on the normal output terminal is applied to the S0 input terminal, to AND gate 74, and through an inverter to OR gate 72.

The driving signal for the time delay element 68 is the inverse output of the signal shaping circuit 60 which is applied to element 68 through an input inverter. At the leading edge of the signal 128, the signal 132 falls to ZERO. A few microseconds later, the signal on the normal output terminal of the time delay element 68 rises to ONE and remains at the level until the trailing edge of signal 128. At the trailing edge of signal 128, time delay element 68 is driven into its reset condition where it remains until the leading edge of signal 130. A few microseconds after the leading edge of signal 130, the normal output of the time delay element 68 goes to ONE and remains at ONE until the trailing edge of signal 130.

AND gate 74 produces a ONE signal 152 only when its input signals are at a ONE level. This condition exists only while the signal 150 on the normal output terminal of time delay element 68 and the signal 146 on normal output terminal of shift register element 64 both remain at ONE. The resulting ONE signal 152 is applied to one input of the AND gate 70. Because a ONE signal from the AND gate 74 is generated only if the shift register element 64 is in a set condition, the false signal 128 generated before shift register element 64 sets is suppressed while true signal 130 is transmitted through the AND gate 70. The signal 154 at the output of AND gate 70 has a leading edge which lags the leading edge of signal 130 by a few microseconds and a trailing edge which coincides with the trailing edge of signal 130.

If ONE signals are applied to both of the input inverters for the OR gate 72, a ZERO signal is produced by that OR gate. Since the signal at one input to the OR gate 72 goes to ONE when the shift register element 64 is driven onto its set condition at the trailing edge of signal 128, the signal from OR gate 72 goes to ZERO only when the signal at its input from the signal shaping circuit 62 goes to ONE, as it does at the leading edge of the shaped signal 138. As a result, the output of the OR gate 72 during each cycle consists of two ONE signals 156 and 158 separated by a ZERO signal lasting the duration of the shaped signal 138. When the shaped signal 138 goes to ZERO, it also causes the shift register element 64 to be triggered onto its reset condition by means of the falling signal on the P0 input terminal. When the shift register element 64 enters its reset condition, the changes at its output terminals cause a ONE signal to be applied only at its S1 input terminal. After the shift register element 64 is reset, its state does not change until another signal is applied to the pulse input terminal P1 through the time delay element 56. The next signal at pulse input terminal P1 does not occur until the beginning of the next scanning cycle.

From the foregoing it is seen that the output of the AND gate 70 falls to ZERO when the field of view of the left scanner crosses from the backlighted area onto the left edge of the strip 10 whereas the output of the OR gate 72 falls to ZERO as the field of view of the right scanner moves across the right edge of the strip 10 onto the backlighted area. The first falling signal at the outputs of the gates 70 and 72 causes OR gate 82 to produce a ONE signal which triggers the timing control circuit 88. When timing control circuit 88 is triggered, a 30 microsecond timing signal 164 appears on its lead 160. In the gage operation illustrated in FIG. 5, the time delay element 78 is first to be driven into its set condition by a falling signal at the output of AND gate 70. The ONE signal 160 appearing on the normal output terminal of time delay element 78 partially enables AND gate 86 while the ZERO signal appearing on its inverse output terminal disables AND gate 84. Until the time delay element 80 is driven into its set condition by a falling signal from OR gate 72, the ONE signal 162 on its inverse output terminal provides a second enabling signal for the AND gate 86.

The AND gate 90 also produces a ONE signal provided there is a steel strip on the runout table that is within certain width limits. The AND gate 86 becomes fully enabled at the instant time delay element 78 produces a ONE signal at its normal output terminal. The enabling of the AND gate 86 results in the application of positive current to the junction 96 by the positive current source 94. When time delay element 80 is finally triggered by an output from the OR gate 72, the signal on its inverse output terminal goes to ZERO while the signal 162 on its normal output terminal goes to ONE. When these signal changes occur, AND gate 86 becomes disabled and positive current is no longer applied to the junction 96. Since the AND gate 86 is enabled when the left scanner system "sees" the left strip edge and is disabled when the right scanner system "sees" the right strip edge, the duration of the current pulse produced by the positive current source 94 is directly proportional to the difference between the actual and the desired width of the steel strip. If the actual width of the steel strip is the desired width, delay elements 78 and 80 are triggered at the same instant to give rise to a null or zero error condition. Neither of the AND gates 84 or 86 is completely enabled during such a condition.

A positive current pulse 166 indicates that the strip is oversized since the left scanning system detected the left edge of the strip before the right scanning system detected the right edge. If the steel strip is undersized, signal 124 occurs earlier with respect to signal 122. Signal 162 from time delay element 80 causes AND gate 84 to be enabled until time delay element 78 is triggered. If AND gate 84 is enabled, the negative current source 92 applies a negative current to the junction 96 until the AND gate 84 is disabled by the triggering of time delay element 78. The magnitude and the type (oversize or undersize) of strip width deviation is seen to be proportional to the duration and polarity of the current applied to the junction 96.

If the strip on the runout table is oversized sufficiently to cover the backlighting unit completely, AND gates 84 and 86 in the current control circuit remain inhibited and the current at junction 96 would appear to indicate a zero error in strip width. To prevent this false indication of zero error, timing control circuit 88 produces a ONE signal on lead 110 if circuit 88 is not triggered by a signal from OR gate 82 during a period greater than the normal scan period. At a preferred drum speed, each scan period is about 5 milliseconds. If the timing control circuit 88 is not triggered within 7 milliseconds, the signal on terminal 110 rises to ONE while the signal on terminal 111 falls to ZERO. The signal on terminal 110 enables AND gate 108 along with the ONE signal from the normal output terminal of the time delay element 106. A current source 112 provides positive saturation current for the comparison amplifier 98. Also, AND gate 90 is disabled along with AND gate 84 and 86 by the ZERO signal on terminal 111. The amplifier 98, when saturated by the positive current, provides a signal indicating the strip width exceeds a predetermined maximum limit.

The overlimit monitoring circuit including AND gate 100 and the string of time delay elements 102, 104, and 106 also controls a source 114 which provides a negative saturation current for the comparison amplifier 98 if the strip is extremely undersized or if there is no strip on the runout table. When both scanners see backlighted areas, ONE signals from the signal shaping circuits 60 and 62 are concurrently applied to the AND gate 100 which produces a ZERO signal that triggers the time delay element 102. If the scanners continue to see backlighted areas for 35 microseconds, indicating the steel is at least 1.5 inches undersize, time delay element 102 changes to its set state. The ONE signal produced on the normal output terminal of time delay element 102 causes time delay element 104 to assume a clear or reset state. In its reset state, time delay element 104 produces a ONE signal on its inverse output terminal which clears time delay element 106. Time delay element 106 remains in its clear state for slightly longer than 6 milliseconds, during which time its normal output terminal carries a ZERO signal and its inverse output terminal carries a ONE signal. Under these conditions, AND gate 108 is disabled while negative saturation current source 114 is enabled. When the negative saturation current from source 114 is applied to the comparison amplifier 98, the amplifier output goes to a level which indicates that the strip is narrower than the predetermined minimum width.

If the steel strip is undersized at all, the left and right scanners concurrently see backlighted areas. That is, the output of AND gate 100 drops to ZERO to trigger time delay element 102 whenever undersize strip is encountered. However, unless the strip is more than 1.5 inches undersize, the output of AND gate 100 rises to ONE within 35 microseconds. Consequently, time delay element 102 remains in its reset state and neither of the time delay elements 104 or 106 is cleared. The ZERO signal on the inverse output terminal of time delay element 106 inhibits negative saturation current source 114 while the ONE signal on the normal output terminal partially enables AND gates 90 and 108. Assuming steel is detected during the preceding scan, AND gate 90 is completely enabled by the ONE signal on lead 111 from timing control circuit 88 while AND gate 108 is disabled by the ZERO signal on lead 110. As a consequence of AND gate 108 being disabled, positive saturation current source 112 is inhibited.

It should be apparent from the preceding description that the input to comparison amplifier 98 consists of a train of current pulses each having a duration dependent upon the magnitude of the difference between the actual and the desired width of the strip and a polarity dependent upon the type of deviation. The comparison amplifier 98 includes filtering circuits for converting the pulse train to an average voltage level. The average level of this voltage over a period of time is proportional to the width deviation. Thus, a width deviation meter and other suitable control instruments may be driven by the output voltage from comparison amplifier 98. Of course, the signals on the output of comparison amplifier 98 are subject to being modified by the error compensation circuit 52.

Since the motor driving the drum 38 is not a constant speed motor, the scan periods and the length of the current pulses may vary slightly. However, the average level of voltage from comparison amplifier 98 remains unchanged since the length of the input current pulses varies directly with the scan period. That is, there may be fewer longer pulses or more shorter pulses as the motor speed varies, although the average value of the input current does not vary.

Figure 6:
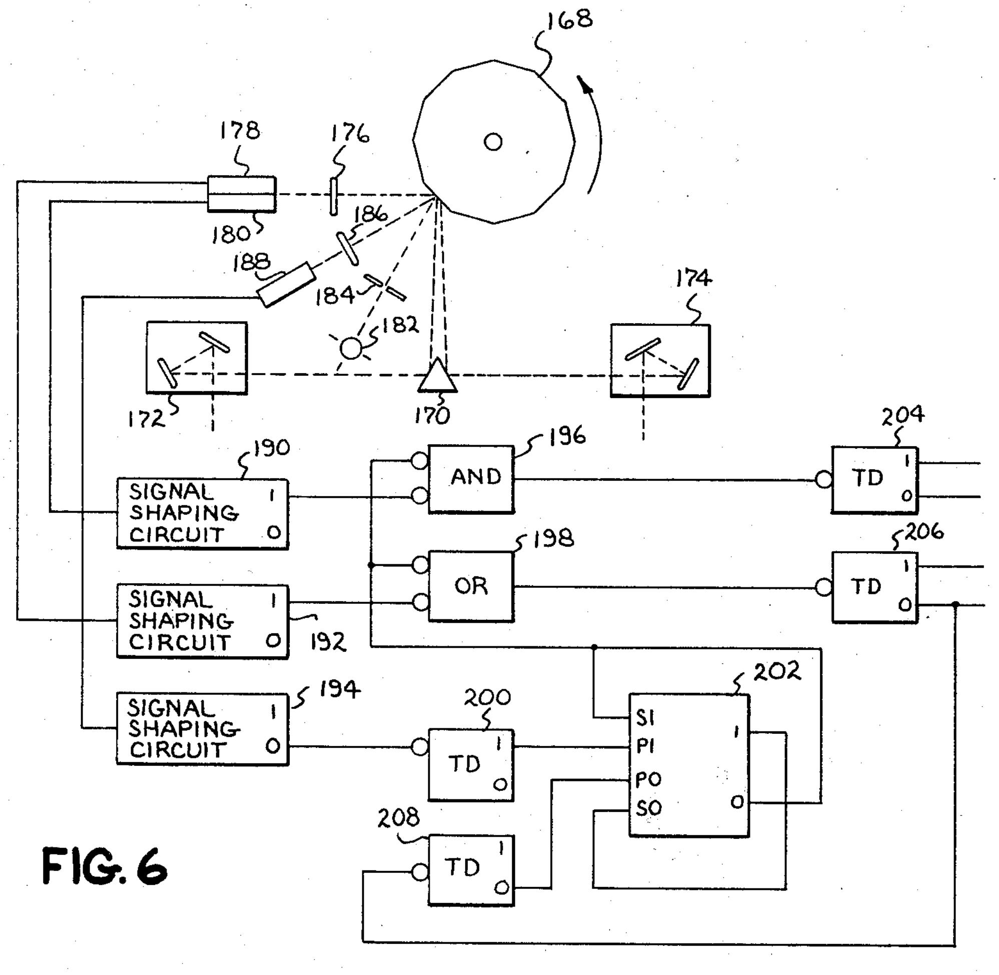
FIG. 6 is a view of a portion of a width gage modified for measuring extremely narrow strips.

If extremely narrow steel strip is likely to be measured by the width gage, the basic gage described above may be modified to eliminate false signals due to overscanning. The false signal suppressing circuitry for a modified gage is shown in FIG. 6. The remainder of the circuitry is not changed. Like the basic gage, the modified gage includes a 12-sided drum 168, a roof mirror 170, and left and right mirror systems 172 and 174, located above the left and right edges respectively of the strip. The fields of view reflected through the mirror systems 172 and 174 and the roof mirror 170 are reflected from the facets on the drum 168 through a focusing lens 176 to a pair of photosensitive devices 178 and 180. The modified gage has a finder system including a finder lamp 182 for projecting a beam of light through a slit 184 to a facet on the drum 168. The reflected beam of light is focused by the lens 186 and is applied to a photosensitive device 188 which generates a ONE signal finder pulse at a time when the field of view of the left scanner is known to be above the left backlighting unit. The angles between the rotating drum 168, the lamp 182, and the photosensitive device 188 determine the time during the scan cycle at which the finder pulse occurs. Similarly, the angles between the rotating drum 168, the mirror system 172, the roof mirror 170, and the photosensitive device 178 determine the time during the scan cycle when the field of view of photosensitive device 178 is above the left backlighting unit. The angular arrangement of the components can be adjusted to assure that the finder pulse is generated at the correct time.

Signals generated by the photoelectric deivces 178, 180, and 188 are shaped in signal shaping circuits 190, 192, and 194 respectively. The signals on the normal output terminals of the signal shaping circuits 190 and 192 are applied through inverters to OR gates 196 and 198, respectively. The signal on the inverse output terminal of the signal shaping circuit 194 is applied through an inverter to a time delay element 200 having its normal output terminal connected to the P1 input terminal of a shift register element 202. The finder pulse generated by photosensitive device 188 causes the signal on the inverse output terminal of signal shaping circuit 194 to temporarily dip to a ZERO level from its normal ONE signal level. At the falling leading edge of this signal, time delay element 200 is triggered. The delay period for time delay element 200 is short enough to allow the element to assume its set state while the finder pulse continues to exist. At the rising trailing edge of the finder pulse, time delay element 200 is reset. The falling signal on the normal output terminal of element 200 causes shift register element 202 to be driven into its set state. With shift register element 202 in its set state, the ONE signal on its normal output terminal is applied to its S0 input terminal to permit the shift register element to be steered to a reset state at the trailing edge of a pulse applied to the P0 input terminal.

Figure 7:
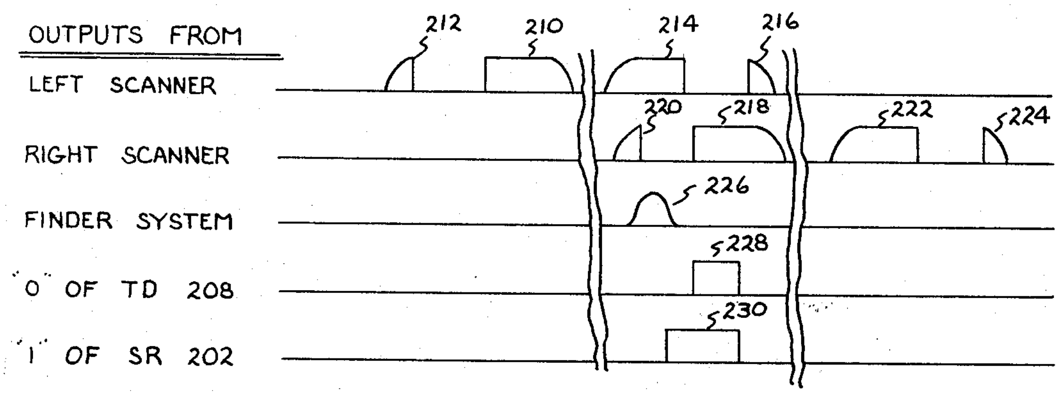
FIG. 7 is a chart of waveforms generated at various points in the modified gage shown in part in FIG. 6.

The ZERO signal appearing on the inverse output terminal of shift register element 202 is applied through inverters to OR gates 196 and 198. At the trailing edge of the signal representing the true left edge of the strip, the output of OR gate 196 falls to ZERO to trigger a time delay element 204. At the trailing edge of the signal representing the true right edge of the strip, the output of OR gate 198 falls to ZERO to trigger another time delay element 206. Time delay elements 204 and 206 control current sources and timing circuits constructed the same way as those described with reference to FIG. 4. The inverse output terminal of time delay element 206 is tied to a time delay element 208. When time delay element 206 assumes its set state, time delay element 208 is triggered. When time delay element 208 assumes its set state, pulse 228 on its inverse output terminal causes shift register element 202 to reset. Since time delay element 206 is triggered only when the true right edge of the strip is sensed, the effect of time delay element 208 is to reset the shift register element following the strip width sensing in readiness for the next scanning cycle. The operation of the modified false signal suppressing system shown in FIG. 6 and the meaning of the term overscanning is expanded upon with reference to the waveforms shown in FIG. 7.

The left scanner of the modified gage normally first generates a false signal 210 as its field of view moves from the right edge of the strip onto the right backlighted area. This false signal is similar to that generated in the basic gage. However, if the strip being measured is extremely narrow, the left scan resulting in the false signal 210 may actually begin on the left backlighted area thus giving rise to an overscan false signal 212. The left scanner also generates a true signal 214 as its field of view moves from the left backlighted area onto the strip surface. Again, if the strip is extremely narrow the left scan may not terminate until its field of view has moved onto the right backlighted area, thus resulting in a second overscan false signal 216.

The right scanner normally first generates a true signal 218 as its field of view moves from the surface of the strip to the right backlighted area. But where the strip is extremely narrow the right scan may instead begin at the left backlighted area, resulting in a false overscan signal 220. A false signal 222 is generated during the right scan subsequent to the true signal 218 as the field of view then moves from the left backlighted area onto the strip's surface. The last signal during the right scan may be a false overscan signal 224 generated as the field of view moves from the strip's surface onto the right backlighted area.

To eliminate the false signals due to overscanning, the photosensitive device 188 causes a finder signal 226 to be generated only when the field of view for the left scanner is above the left backlighted area of the strip. The finder signal 226 sets shift register element 202. The ONE signal 230 on the normal output terminal of element 202 then perimts OR gates 196 and 198 to transmit shaped signals from signal shaping circuits 190 and 192. When the right edge of the strip is sensed by the right scanner, the ZERO signal produced on the output of OR gate 198 triggers time delay element 206. The ZERO signal produced on the inverse output terminal of time delay 206 after its delay period triggers time delay element 208, which sets after its own delay period. The signal on the inverse output terminal of time delay element 208 then falls to a ZERO signal level. This signal, being applied to the P0 input terminal for the shift register element 202, causes the element 202 to be steered into its reset state in readiness for the next scanning cycle.

While the modified system described above is intended for use where extremely narrow strips are to be measured, the modified system functions equally well where strips of normal widths are to be measured. For strips of normal widths, there are merely no overscanning signals such as 212, 216, 220 or 224.

Figure 8:
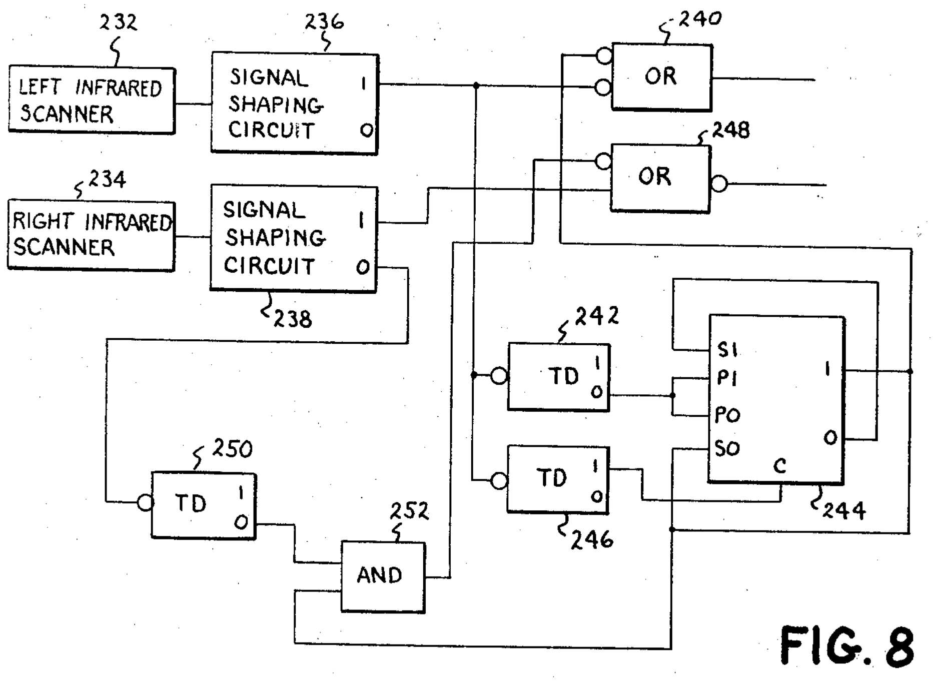
FIG. 8 is a view of a portion of a width gage sensitive to infrared radiation from the strip surface.

The basic and modified systems described above are optical systems having scanners which generate electrical signals based on the optical contrast between relatively bright backlighted areas and the darker area of the strip surface. Since the strip surface is usually red hot and emits infrared radiation, it may be desirable to include an infrared filter in the optical system. If the infrader radiation is relatively high, the gage may be adapted for infrared scanning. Signals in an infrared gage would contrast the infrared radiation level above the strip surface with the low infrared radiation levels above the unlighted areas at both sides of the strip. The physical configuration of an infrared width gage is similar to that of the basic optical width gage. That is, there is a 12-sided rotating mirror which receives reflected views from intermediate mirror systems positioned above the left and right edges of the strip to be measured. A pair of infrared sensitive devices receive the reflected views through a focusing lens and generate signals that are applied to signal shaping circuits. In FIG. 8, the left infrared scanner is shown only as block 232 whereas the right infrared scanner is shown only as block 234.

The signals produced by the left infrared scanner 232 are shaped in a signal shaping circuit 236. Similarly, the signals generated in the right infrared scanner 234 are shaped in a signal shaping circuit 238. The signal on the normal output terminal of the signal shaping circuit 236 is applied through inverters to an OR gate 240, to a time delay element 242 having its inverse output terminal connected to the P1 and P0 input terminals for a shift register element 244, and to a time delay element 246 having its normal output terminal connected to the clearing terminal C for the shift register element 244. The normal output terminal for the signal shaping circuit 238 is connected directly to an OR gate 248 and to a time delay element 250 having its inverse output terminal connected to an AND gate 252. The second input for AND gate 252 is provided by a connection to the normal output terminal of the shift register element 244. The output of the AND gate 252 is connected to the second input of OR gate 248 through an input inverter. The OR gates 240 and 248 are connected to time delay elements in a current control circuit similar to that shown in FIGS. 4*a* and 4*b*.

Figure 9:
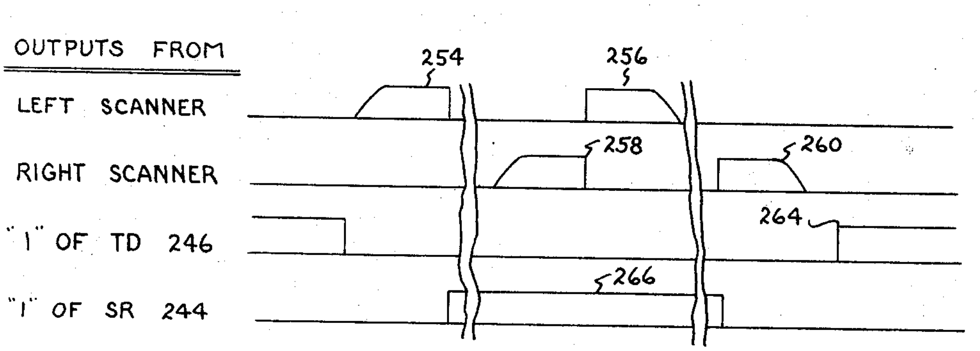
FIG. 9 is a chart of waveforms generated at various points in the infrared width gage shown in part in FIG. 8.

The operation of the infrared width gage having the false signal suppressing system described above is clarified with reference to FIG. 9. Since the infrared scanners are responsive to infrared radiation from the surface of the steel strip, the first signal generated during each scanning cycle is a false signal 254 which occurs as the left scanner sees a field of view moving from the steel strip to the area at the right of the strip. The left scanner then sees a true signal 256 generated as the field of view moves from the area to the left of the strip onto the strip surface. The right scanner first generates a true signal 258 as its field of view moves from the strip surface to the area right of the strip. The last signal generated during each scanning cycle is a false signal 260 produced as the field of view for the right scanner moves across the left edge of the strip onto the strip surface.

At the start of each scanning cycle, the shift register element 244 is in its reset or cleared state. At the trailing edge of the false signal 254, time delay element 242 is triggered. After a predetermined delay period, the time delay element 242 sets. The falling signal on its inverse output terminal is applied to the pulse input terminals P1 and P0 for the shift register element 244 which, having been in its cleared state, is steered into its set state. When the shift register element 244 sets, the ONE signal 266 on its normal output terminal is applied through an inverter to OR gate 240, to the S0 input terminal, and to one input of the AND gate 252. The leading edge of the false signal 254 clears time delay element 246 while the trailing edge of signal 254 triggers element 246. However, the element does not enter its set state since its chosen long delay period does not elapse until after the leading edge of signal 256. The leading edge of signal 256 acts to keep the time delay element 246 in a cleared state. At the trailing edge of the true signal 256, the time delay element 246 is again triggered. After the predetermined delay period has elapsed, time delay element 246 assumes its set state. The waveforms resulting from this consist of a ONE signal 262 which lasts until the leading edge of the signal 254 and a ONE signal 264 which does not come into being until a predetermined delay period has elapsed following the trailing edge of signal 256. The ONE signal 264 clears the shift register element 244 in readiness for the next scanning cycle. The remaining circuitry in an infrared width gage is identical to that shown in FIGS. 4*a* and 4*b* for an optical width gage.

While there has been described at present what are thought to be preferred embodiments of the present invention, variations and modifications may occur to those skilled in the art. Therefore, it is intended that the appended claims shall be construed to include all such variations and modifications as fall within the true spirit and scope of the invention.

We claim:

1. A non-contacting gage for measuring the deviation of a dimension of an object from a desired dimension, including:

(a) scanning means responsive at first and second boundaries of the object to produce independently first and second signals, respectively; and (b) circuit means responsive to the relative displacement of the first and second signals to produce an electrical pulse, the duration and polarity of which are determined by the magnitude and type of deviation from the desired dimension.

2. A non-contacting gage as recited in claim 1 wherein said scanning means includes means responsive to changes in radiation intensity occurring at the boundaries of the object.

3. A non-contacting gage as recited in claim 2 wherein said circuit means includes:

(a) a first current source for producing current of one polarity;

(b) a second current source for producing current of the opposite polarity;

(c) gating means for energizing the first current source when the first signal is first to be generated, for energizing the second current source when the second signal is first to be generated, and for de-energizing both current sources when both signals have been generated.

4. A non-contacting gage for measuring the difference between a desired width for an object and the actual width, including:

(a) an optical scanner for synchronously and repetitively scanning across opposite boundaries of the object in a direction perpendicular to those boundaries;

(b) photosensitive means connected to said optical scanner and responsive to changes in light intensity at the boundaries to produce independently first and second signals; and (c) circuit means connected to said photo-sensitive means and responsive to the relative displacement of the first and second signals during each scan to produce an electrical pulse, the duration and polarity of which are determined by the magnitude and type of difference between the desired and the actual width.

5. A non-contacting gage as recited in claim 4 wherein said optical scanner includes:

(a) a rotatable drum with a plurality of peripheral reflecting facets, said drum being rotated in a plane perpendicular to the boundaries of the object; and (b) an optical system for allowing the facets to simultaneously scan fields of view at opposite boundaries of the object, the fields of view being separated by a distance equal to the desired width of the object.

6. A non-contacting gage as recited in claim 5 wherein said circuit means includes:

(a) a first current source for producing current having a first polarity;

(b) a second current source for producing current having the opposite polarity, the outputs of said first and second source being connected to a common junction; and (c) gating means for energizing the first current source when the first signal is first to be generated, for energizing the second current when the second signal is first to be generated and for de-energizing both current sources when both signals have been generated.

References Cited

UNITED STATES PATENTS

| | | | |
|---|---|---|---|
| 3,355,591 | 11/1967 | Pfister | 250—219 |
| 3,364,358 | 1/1968 | Ashworth | 250—219 |

RALPH G. NILSON, *Primary Examiner.*

M. ABRAMSON, *Assistant Examiner.*

U.S. Cl. X.R.

250—236